US008780426B2

(12) United States Patent
Minabe

(10) Patent No.: US 8,780,426 B2
(45) Date of Patent: Jul. 15, 2014

(54) EXPOSURE APPARATUS AND IMAGE FORMING APPARATUS HAVING HOLOGRAM ELEMENTS

(75) Inventor: Jiro Minabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 790 days.

(21) Appl. No.: 13/016,484

(22) Filed: Jan. 28, 2011

(65) Prior Publication Data

US 2012/0013961 A1 Jan. 19, 2012

(30) Foreign Application Priority Data

Jul. 16, 2010 (JP) ................................ 2010-161956

(51) Int. Cl.
*G02B 5/32* (2006.01)

(52) U.S. Cl.
USPC ............................................. 359/15; 359/35

(58) Field of Classification Search
None
See application file for complete search history.

(56) References Cited

U.S. PATENT DOCUMENTS 5,587,847 A * 12/1996 Chang et al. .................. 359/890
2008/0144179 A1* 6/2008 Mimura et al. ............... 359/599

FOREIGN PATENT DOCUMENTS

JP A-07-234374 9/1995
JP A-08-297459 11/1996
JP A-2001-337586 12/2001
JP A-2006-147293 6/2006

* cited by examiner

*Primary Examiner* — Arnel C Lavarias
(74) *Attorney, Agent, or Firm* — Oliff PLC

(57) ABSTRACT

An exposing device including a light emitting element array of light emitting elements arrayed in a row along a predetermined first direction; a hologram recording layer in which hologram elements are multiplex recorded such that each of the hologram elements corresponds to one of the light emitting elements and diffracts an emission beam from the light emitting element and converges the light onto a light exposure plane, such that focused beam spots are formed on the light exposure plane in a row along the first direction; and a first transmission control section, disposed at the light incident side of the hologram recording layer, provided with a structure in which light blocking sections and light transmitting sections are alternately arrayed along a second direction intersecting with the first direction, and selectively transmitting in the second direction light passing along the optical path of the reference beam.

15 Claims, 15 Drawing Sheets

EXPOSURE APPARATUS AND IMAGE FORMING APPARATUS HAVING HOLOGRAM ELEMENTS

CROSS-REFERENCE TO RELATED APPLICATION

This application is based on and claims priority under 35 USC 119 from Japanese Patent Application No. 2010-161956 filed on Jul. 16, 2010.

BACKGROUND

1. Technical Field

The present invention relates to an exposure apparatus and an image forming apparatus.

2. Related Art

There is a conventional technology in which an incident angle of a light illuminating a hologram surface is limited.

SUMMARY

According to an aspect of the invention, there is provided an exposing device including a light emitting element array of plural light emitting elements arrayed in a row along a predetermined first direction; a hologram recording layer in which plural hologram elements are multiplex recorded such that each of the hologram elements corresponds to one of the plural light emitting elements and diffracts an emission beam from the light emitting element and converges the light onto a light exposure plane, such that plural focused beam spots are formed on the light exposure plane in a row along the first direction; and a first transmission control section, disposed at the light incident side of the hologram recording layer, provided with a structure in which light blocking sections and light transmitting sections are alternately arrayed along a second direction intersecting with the first direction, and selectively transmitting in the second direction light passing along the optical path of the reference beam that recorded the hologram element.

BRIEF DESCRIPTION OF THE DRAWINGS

Exemplary embodiments of the present invention will be described in detail based on the following figures, wherein.

DETAILED DESCRIPTION

Figure 1:
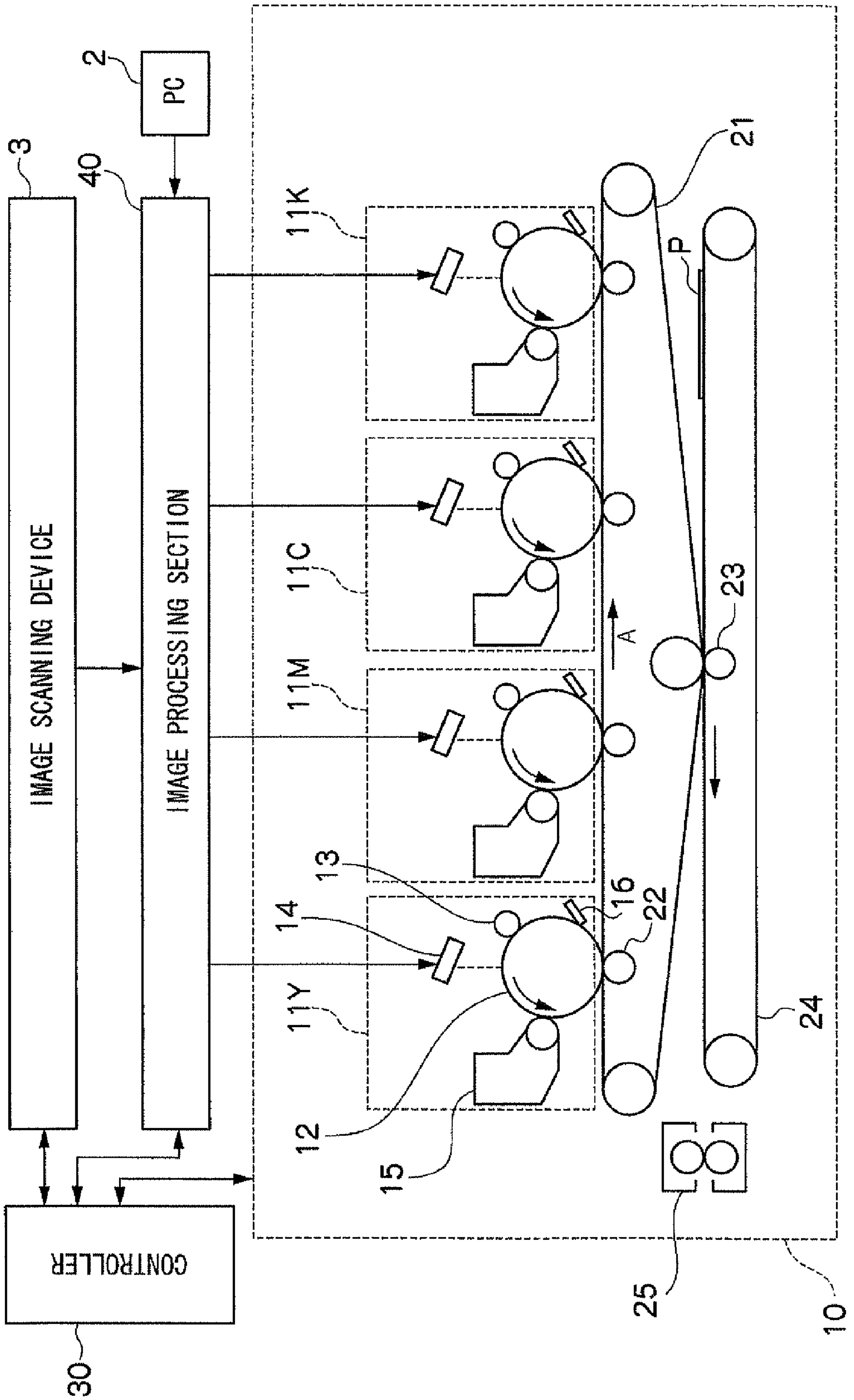
FIG. 1 is a schematic diagram showing an example of a configuration of an image forming apparatus according to an exemplary embodiment of the present invention.

Detailed explanation now follows regarding an exemplary embodiment of the present invention, with reference to the drawings.

Image Forming Apparatus Installed with LED Print Head

First, explanation follows regarding an image forming apparatus installed with an LED print head according to an exemplary embodiment of the present invention. In, for example, copying machines, printers, and the like, that form images by electrophotographic methods, Light Emitting Diode (LED) exposing devices, employing LEDs as light sources, are becoming prevalent as exposing devices for writing a latent image onto a photoreceptor drum, in place of conventional light scanning exposing devices (namely light scanning writing devices). In LED exposing devices, a scanning optical system is not required, enabling much greater compactness in comparison to light scanning methods. LED exposing devices are also advantageous in not requiring a drive motor for driving a polygon mirror, and not generating mechanical noise.

LED exposing devices are referred to as LED print heads, abbreviated to LPH. Conventional LED print heads are provided with an LED array of large number of LEDs arrayed on an elongated substrate, and a lens array disposed with a large number of gradient index rod lenses. In the LED array, there are a large number of LEDs, corresponding to the number of pixels arrayed along the fast scanning direction, for example 1200 pixels per inch (namely 1200 dots per inch (dpi)). Conventionally, rod lenses are employed in a lens array, such as, for example, SELFOC (registered trademark) lenses or the like. Light emitted from each of the LEDs is converged by the rod lens, and a right side up, same size image is formed on a photoreceptor drum.

LED print heads in which "hologram elements" are employed in place of rod lenses are being investigated. The image forming apparatus according to the present exemplary embodiment is equipped with an LED print head provided with "a hologram element array", as described below. In an LPH in which rod lenses are employed, the optical path length (operating distance) from the end face of the lens array to the imaging point is short, of the order of a few mm, and the proportion of the periphery of the photoreceptor drum occupied by the exposing device is large. In contrast thereto, in an LPH 14 provided with a hologram element array, the operating distance is long, of the order of a few cm, the periphery of the photoreceptor drum is not crowded, and as a whole, the image forming apparatus is made more compact.

Generally, in an LPH employing LEDs emitting incoherent light, as the coherency reduces, blurred spots (referred to as chromatic aberration) occurs, and it is not easy to form very small diameter spots. In contrast thereto, in the LPH 14 provided with the hologram element array, the incident angle selectivity and wavelength selectivity of the hologram elements is high, and sharp outlined very small diameter spots are formable on a photoreceptor drum 12.

FIG. 1 is a schematic diagram showing an example of a configuration of an image forming apparatus according to an exemplary embodiment of the present invention. This image forming apparatus is a so-called tandem digital color printer, provided with: an image forming process section 10, serving as an image forming section, in which image forming is performed corresponding to image data of each of the colors; a controller 30 that controls the operation of the image forming apparatus; and an image processing section 40, connected to an image scanning device 3 and, for example, to an external device, such as, for example, a personal computer (PC) 2 or the like, the image processing section 40 subjecting image data received from these external devices to specific image processing.

The image forming process section 10 includes four image forming units 11Y, 11M, 11C, 11K that are disposed parallel to each other at uniform intervals. The image forming units 11Y, 11M, 11C, 11K each form toner images of yellow (Y), magenta (M), cyan (C) and black (K), respectively. Where appropriate the image forming units 11Y, 11M, 11C, 11K are referred to collectively as the "image forming units 11".

Each of the image forming units 11 includes: a photoreceptor drum 12, serving as an image holding body, for forming an electrostatic latent image on and for holding a toner image; a charging device 13 that uniformly charges the surface of the photoreceptor drum 12 to a specific electrical potential; the LED print head (LPH) 14, serving as an exposing device, that exposes the photoreceptor drum 12 that has been charged by the charging device 13; a developing device 15 that develops the electrostatic latent image obtained with the LPH 14; and a cleaner 16 that cleans the surface of the photoreceptor drum 12 after transfer.

The LPH 14 is an elongated print head of substantially the same length as the axial direction length of the photoreceptor drum 12. The LPH 14 is disposed at the periphery of the photoreceptor drum 12 facing such that the length direction of the LPH 14 is along the axial direction of the photoreceptor drum 12. In the present exemplary embodiment, plural LEDs are disposed along the length direction of the LPH 14 in an array. Plural hologram elements, are disposed above the LED array in an array so as to correspond to the plural LEDs.

As described below, the length of the operating distance of the LPH 14 equipped with hologram element array is long, and the LPH 14 is disposed at a separation distance of several cm from the surface of the respective photoreceptor drum 12. Due thereto, the occupied width of the LPH 14 along the circumferential direction of the photoreceptor drum 12 is small, and crowding around the periphery of the photoreceptor drum 12 is alleviated.

The image forming process section 10 includes: an intermediate transfer belt 21, onto which toner images, of each of the colors formed on the respective photoreceptor drums 12 of the image forming units 11, are multi-transferred; primary transfer rolls 22 that transfer (primary transfer) the toner images of each of the colors of the respective image forming units 11 in sequence onto the intermediate transfer belt 21; a secondary transfer roll 23 that transfers in one action (secondary transfers) the superimposed toner images transferred onto the intermediate transfer belt 21 onto paper P, serving as a recording medium; and a fixing device 25 that fixes the secondary transferred images to the paper P.

Explanation follows regarding operation of the above image forming apparatus. First, the image forming process section 10 performs image forming operation, based on a control signal, such as, for example, a synchronization signal supplied from the controller 30. In so doing, image data input from the image scanning device 3 or the PC 2 is subjected to image processing by the image processing section 40, and then supplied to each of the image forming units 11 through an interface.

For example, in the yellow image forming unit 11Y, the surface of the photoreceptor drum 12, uniformly charged to a specific electrical potential by the charging device 13, is exposed by the LPH 14 emitting light based on the image data obtained from the image processing section 40, and electrostatic latent images are formed on the photoreceptor drum 12. Namely, the surface of the photoreceptor drum 12 is fast scanned by each of the LEDs of the LPH 14 emitting light according to the image data, and slow scanned by rotating the photoreceptor drum 12, thereby forming an electrostatic latent image on the photoreceptor drum 12. The electrostatic latent image that has been formed is developed by the developing device 15, forming a yellow toner image on the photoreceptor drum 12. Toner images of each of the colors magenta, cyan, and black are formed in a similar manner in the image forming units 11M, 11C, 11K.

Each of the color toner images formed on the respective image forming unit 11 is transferred (primary transferred) onto the intermediate transfer belt 21 that is rotating in the arrow A direction of FIG. 1, by sequential electrostatic attraction using the primary transfer rolls 22. Superimposed toner images are formed on the intermediate transfer belt 21. The superimposed toner images are conveyed, along with movement of the intermediate transfer belt 21, to a region where the secondary transfer roll 23 is disposed (a secondary transfer portion). When the superimposed toner images have been conveyed to the secondary transfer portion, paper P is fed into the secondary transfer portion with a timing that matches conveying of the toner images to the secondary transfer portion.

Then, the superimposed toner images are electrostatically transferred (secondary transferred) in one action onto the conveyed paper P by a transfer field formed by the secondary transfer roll 23 at the secondary transfer portion. The paper P, onto which the superimposed toner images have been electrostatically transferred, separates from the intermediate transfer belt 21, and is conveyed by a conveying belt 24 to the fixing device 25. The unfixed toner images on the paper P that has been conveyed to the fixing device 25 are imparted with heat and pressure in fixing processing by the fixing device 25, and fixed onto the paper P. Then, the paper P formed with the fixed image is discharged to a discharge tray (not shown in the figures) provided in a discharge section of the image forming apparatus.

LED Print Head (LPH)

Figure 2:
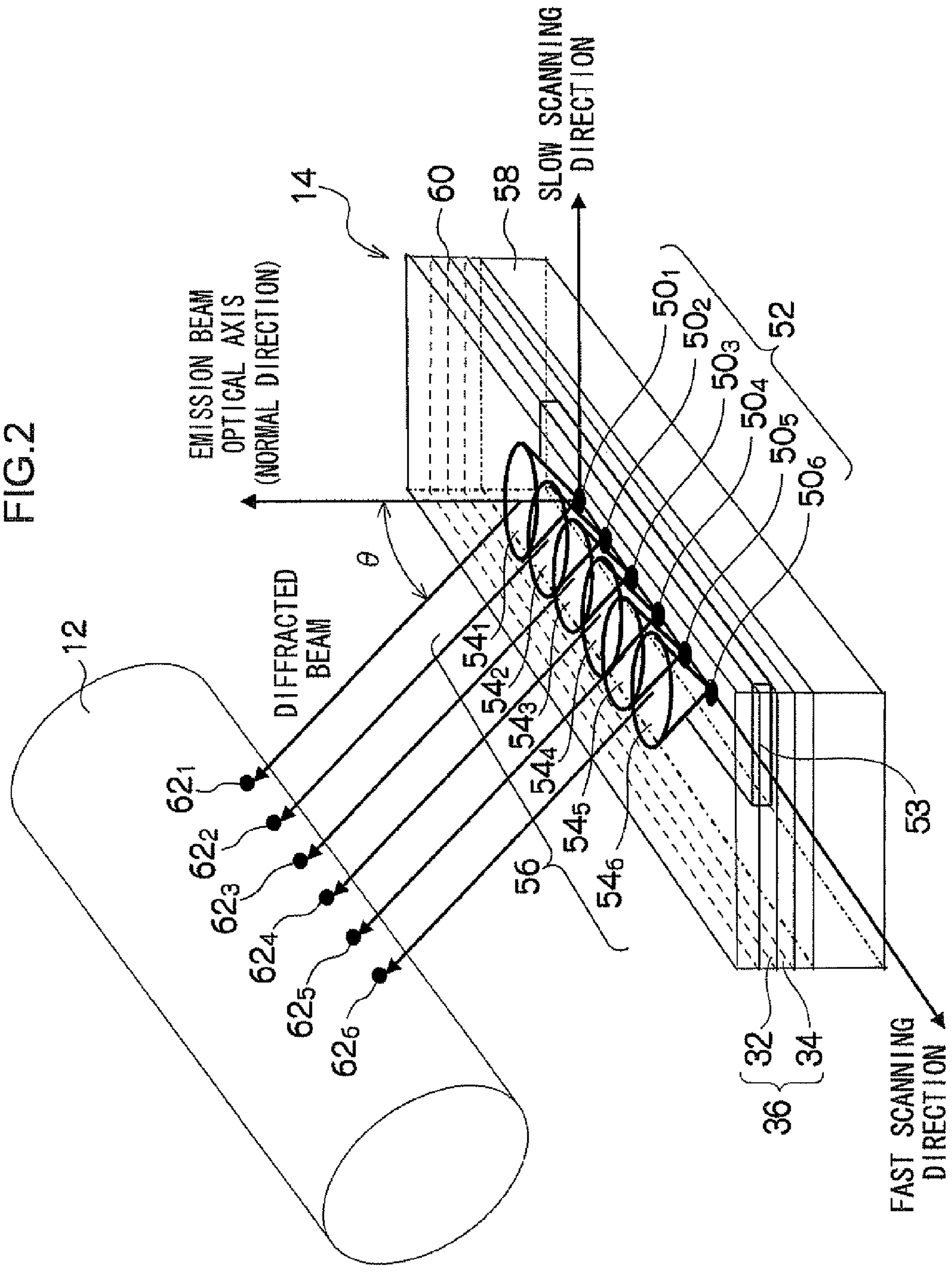
FIG. 2 is a schematic perspective view showing an example of an LED print head according to an exemplary embodiment of the present invention.

FIG. 2 is a schematic perspective view showing an example of a configuration of an LED print head according to an exemplary embodiment of the present invention. As shown in FIG. 2, the LED print head (LPH 14) includes: an LED array 52 provided with plural LEDs 50; a hologram element array 56 provided with plural hologram elements 54, corresponding one-to-one with the plural LEDs 50. In the example shown in FIG. 2, the LED array 52 is provided with six individual LEDs $50_1$ to $50_6$, and the hologram element array 56 is provided with six individual hologram elements $54_1$ to $54_6$. When there is no need to discriminate between these elements, the LEDs $50_1$ to $50_6$ are referred to collectively as the "LEDs 50", and the hologram elements $54_1$ to $54_6$ are referred to collectively as the "hologram elements 54".

The plural LEDs 50 are each arrayed on an LED chip 53. The LED chip 53 is packaged, along with drive circuits (not shown in the figures) for driving each of the LEDs 50, to an elongated LED substrate 58. The LED chip 53 is positionally aligned such that the plural LEDs 50 are in a row along the fast scanning direction, and placed on the LED substrate 58. Due thereto, the LEDs 50 are respectively arrayed along a direction that is parallel to the axial direction of the photoreceptor drum 12.

The array direction of the LEDs 50 is the "fast scanning direction". Each of the LEDs 50 is arrayed such that the interval (LED pitch) in the fast scanning direction between two adjacent LEDs 50 is a constant interval. Slow scanning is performed by rotating the photoreceptor drum 12, in a direction orthogonal to the "fast scanning direction" indicated as the "slow scanning direction". In the following, the positions where the LEDs 50 are disposed are referred to as "light emitting points" where appropriate.

As the LED array 52, for example, various embodiments of LED array may be employed, such as an LED array with plural LEDs packaged in chip units on a substrate. In an array of plural individual LED chips, each arrayed with plural LEDs, the plural LED chips may be disposed in a straight line, or may be disposed in a staggered formation. Two or more individual LED chips may also be disposed in the slow scanning direction. FIG. 2 merely illustrates a schematic representation of the LED array 52, having plural LEDs 50 arrayed in a single dimension on a single LED chip 53.

Plural of the LED chips 53 may be arrayed in a staggered formation in the LED array 52. Namely, plural LED chips 53 may be disposed so as to form one row along the fast scanning direction, and also disposed in a second row, shifted by a specific interval in the slow scanning direction. Even when split across the plural LED chips 53, the plural LEDs 50 within a single LED chip 53 are respectively arrayed such that the interval between adjacent two LEDs 50 in the fast scanning direction is a uniform interval.

As the LED array 52, an SLED chip (not shown in the figures) arrayed with plural Self-scanning LEDs (SLEDs) may be employed, or an SLED array may be configured with plural individual SLED chips, such that each of the LEDs are arrayed in a row along the fast scanning direction. In an SLED array, switching ON and OFF is performed with two signal lines, and each of the SLEDs is selectively caused to emit light with a common data line. By employing such an SLED array, a fewer number of wiring lines are required on the LED substrate 58.

A hologram recording layer 60 is formed above the above LED chip(s) 53 disposed on the LED substrate 58, with a specific separation therebetween. The hologram element array 56 is formed within the hologram recording layer 60 formed on the LED substrate 58. A transmission controller 36 is disposed between the LED substrate 58 and the hologram recording layer 60 for controlling transmission light. In the present exemplary embodiment, the transmission controller 36 is configured including a louver layer 32 for controlling transmission light in the fast scanning direction, and a louver layer 34 for controlling transmission light in the slow scanning direction.

In the hologram recording layer 60, the plural hologram elements $54_1$ to $54_6$ are formed along the fast scanning direction so as to correspond with each of the respective plural LEDs $50_1$ to $50_6$. The respective hologram elements 54 are arrayed such that the separation between two adjacent hologram elements 54 in the fast scanning direction is substantially the same separation as the separation distance between LEDs 50 in the fast scanning direction, described above. Namely, the hologram elements 54 are formed with relatively large diameters such that two adjacent hologram elements 54 overlap with each other. Two adjacent holograms may also have different shapes from each other.

The hologram recording layer 60 is configured from a polymer material capable of permanently recording and holding a hologram. A so-called photopolymer may be employed as such a polymer material. A photopolymer records a hologram by utilizing the change in refractive index due to polymerization of a photo-polymerizable monomer.

Figure 3:
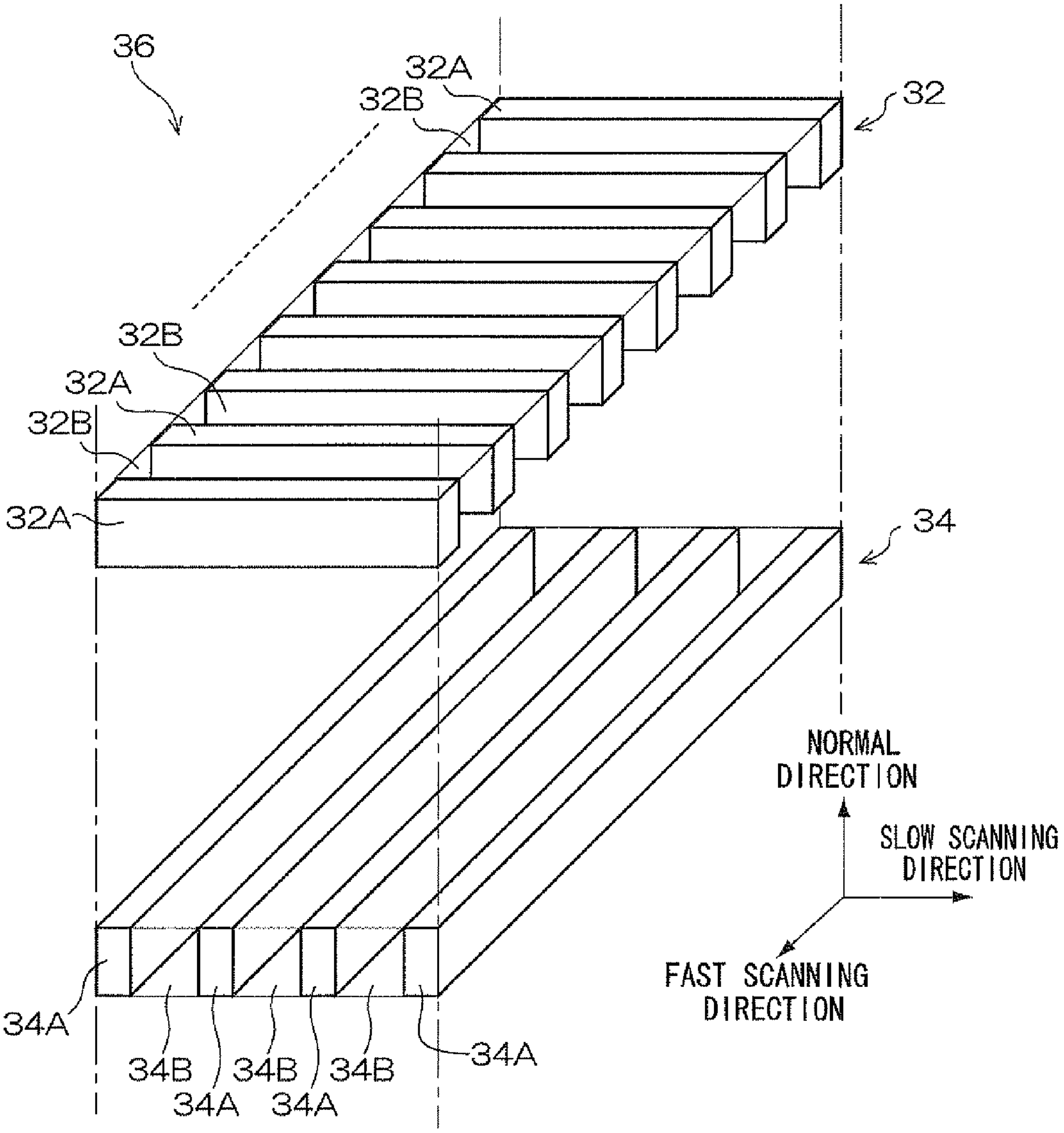
FIG. 3 is a partial exploded perspective view showing an example of a configuration of a transmission controller provided with a louver structure.

FIG. 3 is a partial exploded perspective view showing an example of a configuration of the transmission controller 36 provided with a louver structure. A structure (louver structure) is provided with louver layers 32, 34 with light blocking sections and light transmitting sections alternately arrayed along respective predetermined directions. The louver layer 32 is configured with vane shaped light blocking sections 32A and light transmitting sections 32B arrayed alternately along the fast scanning direction. The louver layer 32 controls transmission light in the fast scanning direction. The louver layer 34 is configured with vane shaped light blocking sections 34A and light transmitting sections 34B arrayed alternately along the slow scanning direction. The louver layer 34 controls transmission light in the slow scanning direction.

The louver structure selectively blocks and transmits incident light according to the height (thickness in the normal direction), disposition separation and disposition angle of the light blocking sections. The louver layers 32, 34 thereby control transmission light in the array direction of their respective light blocking sections, so as to selectively allow transmission of light along the optical path of the reference beam that recorded the hologram elements 54. Note that there is a more detailed explanation later of the principles of transmission light control employing a louver structure.

When the LED 50 incoherent light sources are caused to emit light, light emitted from the LEDs 50 is known to scatter and spread out. The phenomenon gives rise to a so-called "Lambertian distribution of light". In the same way, a similar phenomenon (see, for example, FIG. 5A, FIG. 5B, FIG. 10, and FIG. 11) is observed with an electroluminescent (EL) element incoherent light source too. Part of the diffuse light (incoherent light) emitted from the LED 50 is transmitted through the transmission controller 36, passing along the optical path of the reference beam and spreading out from the light emitting point to the hologram diameter. Due to the emitted light of the LED 50, substantially the same state is achieved as when the reference beam was illuminated onto the hologram elements 54.

As shown in FIG. 2, in the LPH 14 equipped with the LED array 52 and the hologram element array 56, from out of the beams emitted from the respective LED of the six individual LEDs $50_1$ to $50_6$, light passing along the optical path of the reference beam is transmitted through the transmission controller 36, and is incident to the corresponding hologram element $54_1$ to $54_6$. The hologram elements $54_1$ to $54_6$ diffract the incident light and generate diffracted beams. Each of the respective diffracted beams generated by the respective hologram elements $54_1$ to $54_6$ diverges from the optical path of the reference beam, and is emitted with an optical axis in a direction that forms an angle of θ degrees to the emission beam optical axis, as light converging towards the photoreceptor drum 12.

Each of the emitted diffracted beams converges towards the photoreceptor drum 12, and an image is formed on the surface of the photoreceptor drum 12 that is disposed at the focal plane some few cm away. Namely, each of the plural hologram elements 54 functions as an optical member that diffracts the light emitted from the corresponding LED 50, converges the light, and forms an image on the surface of the photoreceptor drum 12. Very small diameter spots $62_1$ to $62_6$ are formed by the respective diffracted beams on the surface of the photoreceptor drum 12, so as to form an array of a single row in the fast scanning direction. In other words, the photoreceptor drum 12 is fast scanned by the LPH 14. When there is no need to discriminate between the individual spots $62_1$ to $62_6$ they are referred to collectively as "spots 62".

Shape of Hologram Elements

Figure 4A:
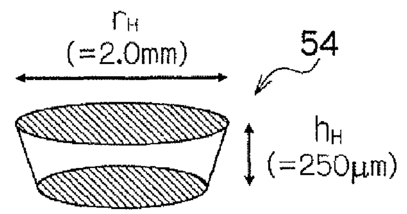
FIG. 4A is a perspective view showing an outline shape of a hologram element.
Figure 4B:
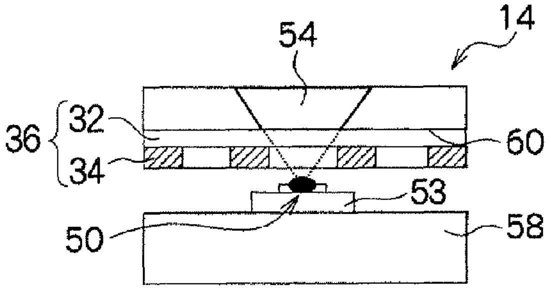
FIG. 4B is a cross-section taken along the slow scanning direction of an LED print head.
Figure 4C:
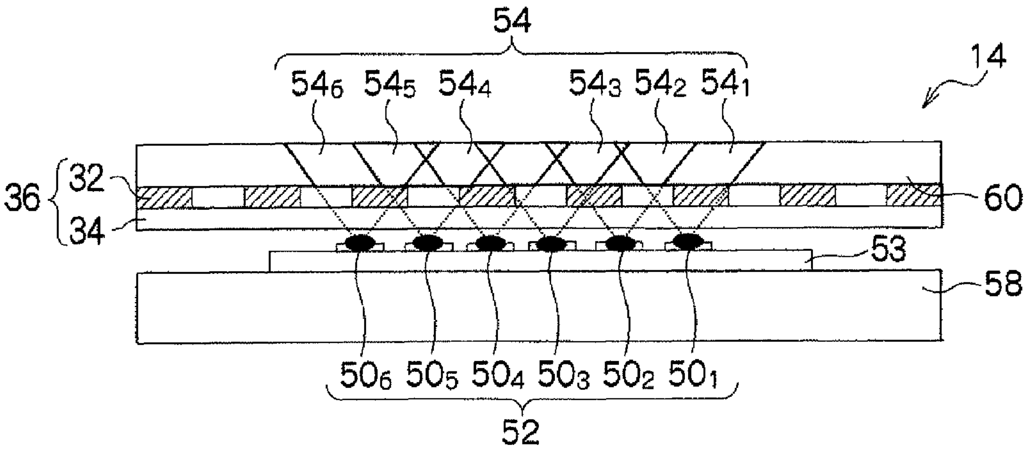
FIG. 4C is a cross-section taken along the fast scanning direction of an LED print head.

FIG. 4A is a perspective view showing schematically the shape of the hologram elements, FIG. 4B is a cross-section taken along the slow scanning direction of the LED print head, and FIG. 4C is a cross-section taken along the fast scanning direction of the LED print head.

As shown in FIG. 4A, each of the hologram elements 54 is a volume hologram, generally referred to as a thick hologram. As described above, the hologram elements have high incident angle selectivity and wavelength selectivity, controlling the diffracted beam emission angle (diffraction angle) with high precision, and forming very small diameter spots with a sharp outline. The greater the thickness of the hologram, the higher the precision obtained in the diffraction angle.

As shown in FIG. 4A and FIG. 4B, each of the hologram elements 54 forms a truncated circular cone shape with the front face of the hologram recording layer 60 as the bottom face of the truncated circular cone, converging towards the LED 50 side. In this example, explanation is of a case of truncated circular cone shaped hologram elements, however the hologram elements are not limited to such shapes. For example, the hologram elements may, for example, be shaped as circular cones, elliptical cones, truncated elliptical cones or the like. The diameter of the truncated circular cone shaped hologram elements 54 is largest at the bottom face. The diameter of the circular bottom face is referred to as the "hologram diameter $r_H$".

Each of the hologram elements 54 has a "hologram diameter $r_H$" larger than the separation of the LEDs 50 in the fast scanning direction. For example, with a separation of the LEDs 50 in the fast scanning direction of 30 μm, the hologram diameter $r_H$ is 2 mm, and the hologram thickness $h_H$ is 250 μm. By employing the hologram elements 54 of this size, an operation distance of about 4 cm, and a spot size ϕ of about 40 μm (radial width of about 30 μm) is achieved. Consequently, as shown in FIG. 2 and FIG. 4C, two mutually adjacent hologram elements 54 are formed so as to overlap with each other to a large extent. The plural hologram elements 54 are, for example, multiplex recorded by spherical wave shift multiplexing.

Each of plural LEDs 50 is disposed on the LED substrate 58 with its light emitting face facing towards the hologram recording layer 60 side, so as to emit light towards the side of the corresponding hologram element 54. The "emission beam optical axis" of the LEDs 50 passes through near to the center (for example, the axis of symmetry of the truncated circular cone) of the corresponding hologram elements 54, in a direction orthogonal to the LED substrate 58. As illustrated, the emission beam optical axes are orthogonal to both the fast scanning direction and the slow scanning direction. Namely, "emission beam optical axis" refers here to the center line of diffuse light emitted from the emission region of one of the LEDs 50, and matches the normal direction to the LED substrate 58 when the LED 50 is treated as a light emitting point.

While not shown in the figures, the LPHs 14 are each held by a retaining member such as, for example, a housing, a holder or the like, such that the diffracted beams generated by the hologram elements 54 are emitted towards the photoreceptor drum 12, attached at a specific position inside the respective image forming unit 11 shown in FIG. 1. Configuration may be made such that the LPH 14 is movable in the optical axis direction of the diffracted beams by employing an adjuster such as, for example, an adjustment screw (not shown in the figures). In such cases, adjustment is made with the adjuster described above such that the image forming position (focal plane) due to the hologram elements 54 is positioned on the surface of the photoreceptor drum 12. Configuration may also be made with a protection layer, such as, for example, a cover glass, transparent resin, or the like, formed over the hologram recording layer 60. The adherence of dust is prevented by such a protection layer.

Principles of Transmission Light Control with Louver Structure

Figure 5A:
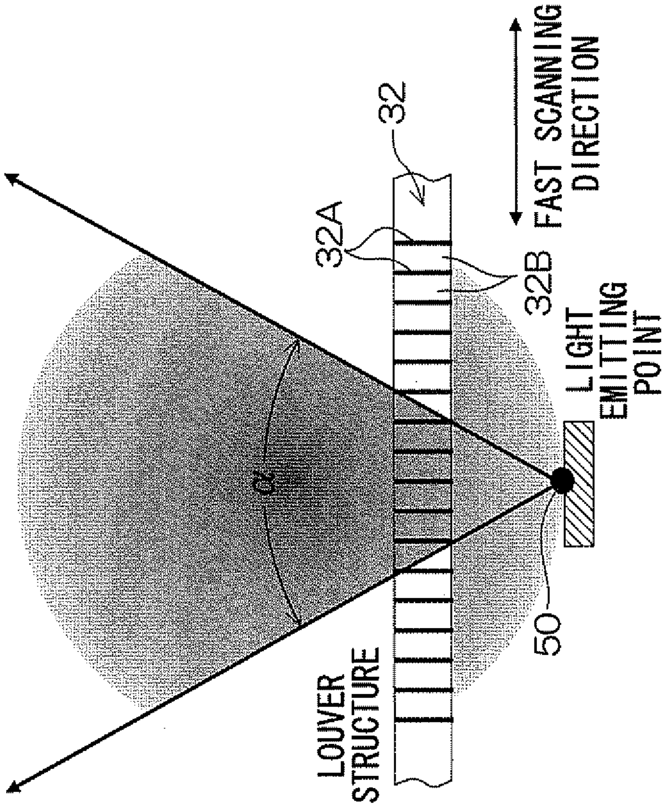
FIG. 5A and FIG. 5B are schematic diagrams showing the principle of transmission light control by a louver structure.
Figure 5B:
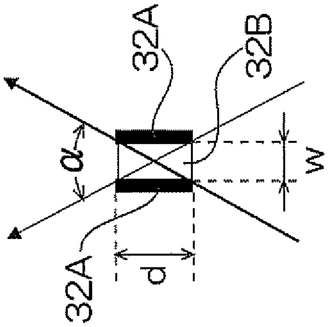

FIG. 5A, FIG. 5B, and FIGS. 6A to 6C are diagrams schematically showing the principles by which transmission light is controlled by a louver structure. As shown in FIG. 5A, in the louver layer 32, vane shaped light blocking sections 32A and light transmitting sections 32B are arrayed alternately parallel to each other along the fast scanning direction. As shown in FIG. 5B, focusing on a single pair of the light blocking sections 32A adjacent on either side of a given light transmitting sections 32B, the size of "spread angle α" in the fast scanning direction and center line direction of transmission light transmitted through the light transmitting sections 32B is determined according to a "disposition spacing w" and "normal direction thickness d". The center line of the "spread angle α" here matches the emission beam optical axis.

As shown in FIG. 5A, the plural light blocking sections 32A arrayed parallel to each other in the louver layer 32 may be considered in a similar manner to the pair of the light blocking sections 32A. Light in the range of the "spread angle α" from the diffuse light emitted from the light emitting points at the LEDs 50 is transmitted through the louver layer 32 irrespective of the arrayed number and arrayed positions of the light blocking sections 32A. However, light from the diffuse light that is outside of the range of the "spread angle α" is blocked by the louver layer 32. When disposing the louver layer 32 there is no need for optical axis alignment and positional alignment of the louver layer 32 to the pairs of LED 50 and mutually corresponding hologram element 54.

Figure 6C:
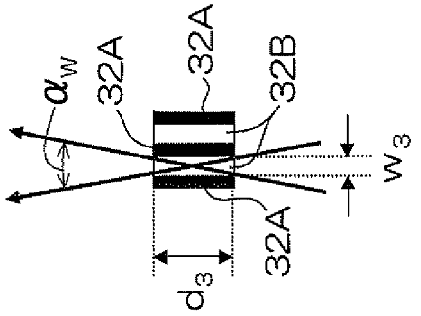
FIG. 6A to FIG. 6C are diagrams schematic showing the principle of transmission light control by a louver structure.
Figure 6B:
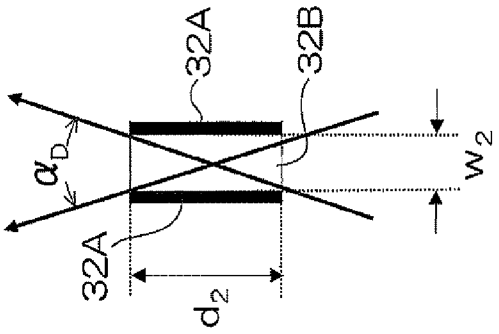
Figure 6A:
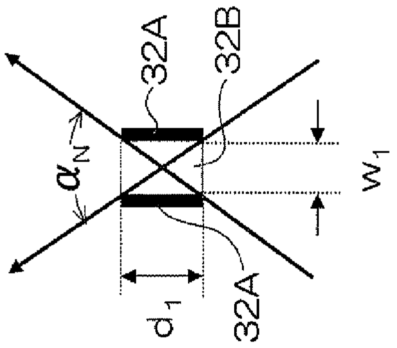

In the example in FIG. 6A to FIG. 6C, the direction of the center line of the "spread angle α" and the emission beam optical axis match each other. Accordingly, the size of the "spread angle α" is determined by the "disposition spacing w" and the "direction thickness d" of the louver layer 32. The disposition angle, array direction thickness and the like of the louver layer 32 are also factors in determining the size and the center line of the "spread angle α". Namely, by appropriately setting the parameters expressing the louver structure, transmission light of the desired spread angle α is obtained by the louver layer 32, passing along the light path of the reference beam that recorded the hologram element.

For example, as shown in FIG. 6A, when the light blocking sections 32A have disposition spacing "$w_1$" and normal direction thickness "$d_1$", then a reference spread angle "$\alpha_N$" is obtained. However, as shown in FIG. 6B, when the light blocking sections 32A have a disposition spacing "$w_2$", equivalent to "$w_1$", and the normal direction thickness of the light blocking sections 32A is made "$d_2$", greater than "$d_1$", a spread angle "$\alpha_n$" smaller than the reference spread angle "$\alpha_N$" is obtained. Furthermore, as shown in FIG. 6C, when the normal direction thickness of the light blocking sections 32A is made "$d_1$", equivalent to "$d_3$", and the disposition spacing of the light blocking sections 32A is made "$w_3$", narrower than "$w_1$", a spread angle "$\alpha_w$" smaller than the reference spread angle "$\alpha_N$" is obtained.

Hologram Recording Method

Figure 7A:
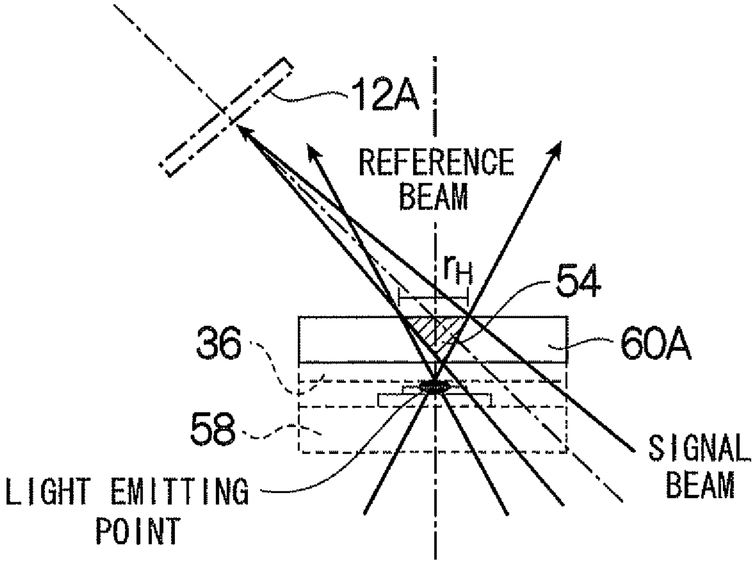
FIG. 7A and FIG. 7B are diagrams showing a way in which a hologram is recorded in a hologram recording layer.
Figure 7B:
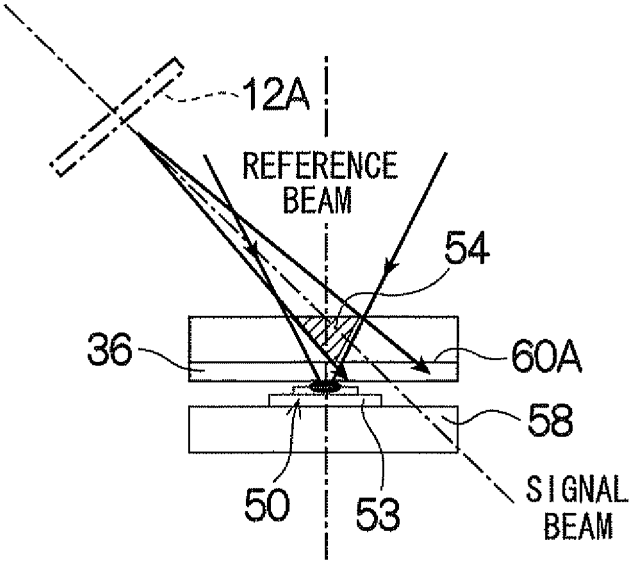

Explanation now follows regarding a recording method of a hologram. FIG. 7A and FIG. 7B are diagrams showing an element formed by the hologram element 54 in the hologram recording layer, namely, an element of a hologram recorded in the hologram recording layer. The photoreceptor drum 12 is omitted from the figure, and only a surface 12A, which is the image forming plane, is illustrated. A hologram recording layer 60A is a recording layer prior to forming the hologram element 54, with the suffix A appended thereto in order to differentiate from the hologram recording layer 60 that has been formed with the hologram element 54.

As shown in FIG. 7A, coherent light passes along an optical path of the diffracted beam for forming an image on the surface 12A, and is illuminated onto the hologram recording layer 60A as a signal beam. At the same time, coherent light passing along the optical path of diffuse light, spreading out from the light emitting point to the specific hologram diameter $r_H$ while passing through the hologram recording layer 60A, is illuminated onto the hologram recording layer 60A as the reference beam. A laser light source, such as, for example, a semiconductor laser or the like, is employed for the illumination of the coherent light.

The signal beam and the reference beam are illuminated onto the hologram recording layer 60A from the same side (the side at which the LED substrate 58 is disposed). An interference fringe (intensity distribution) obtained by interference of the signal beam and the reference beam is recorded across the thickness direction of the hologram recording layer 60A. The hologram recording layer 60 formed with the transmission hologram element 54 is thereby obtained. The hologram element 54 is a volume hologram in which an intensity distribution of an interference fringe is recorded in both the plane direction and the thickness direction. The LPH 14 is produced by attaching the hologram recording layer 60 above the LED substrate 58 packaged with the LED array 52, with the transmission controller 36 disposed between the hologram recording layer 60 and the LED substrate 58.

Alternatively, as shown in FIG. 7B, after attaching the hologram recording layer 60A and the transmission controller 36 above the LED substrate 58 packaged with the LED array 52, the signal beam and the reference beam may be illuminated from the opposite side to the direction described above to record a holograms (phase conjugation recording). The hologram recording layer 60 formed with the transmission hologram elements 54 can be obtained similarly in such cases. Explanation now follows regarding a manufacturing method of the LPH 14.

LPH Manufacturing Method

Explanation now follows regarding a method of manufacturing the LPH 14. FIG. 8A to FIG. 8E are process diagrams showing an example of a manufacturing method for manufacturing an LED print head employing a film shaped louver structure body. This is substantially as in the explanation of a recording method of the hologram elements 54. These drawings are cross-sections taken along the slow scanning direction, and explanation will be given of the manufacturing process of the LPH 14 provided with the LED array 52 and the hologram element array 56 although only one each of the individual LEDs 50 and the hologram elements 54 are shown.

Figure 8A:
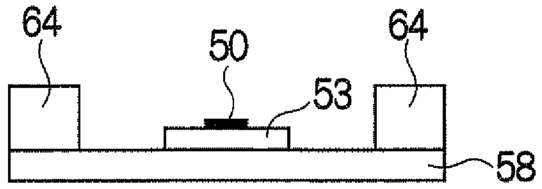
FIG. 8A to FIG. 8E are process diagram showing an example of a manufacturing method for manufacturing the LED print head employing a film shaped louver structure body.

First, as shown in FIG. 8A, an LED array 52 is prepared with the LED chip(s) 53 provided with plural LEDs 50 packaged on the LED substrate 58. A support section 64 is formed in a frame shape at a peripheral portion of the surface of the LED substrate 58, for retaining the hologram recording layer 60 and the transmission controller 36.

Figure 8B:
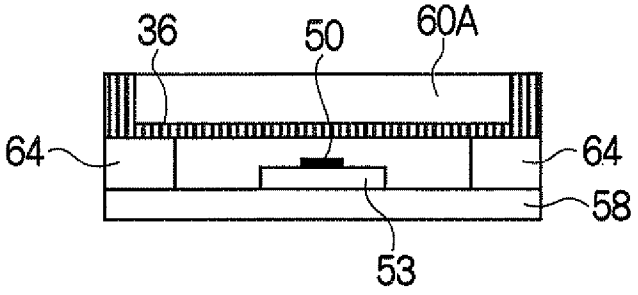

Next, as shown in FIG. 8B, a film shaped louver structure body is employed to configure the transmission controller 36. As the film shaped louver structure body, for example, so-called louver films, viewing angle control films or the like may be employed. Examples of commercially available films therefore include, for example, "View Control" and "Shin-Etsu VC-FILM" manufactured by Shin-Etsu Polymer Co., Ltd, "Light Control Film" manufactured by Sumitomo 3M Ltd., and the like. Film shaped louver structure bodies are employed to introduce a louver structure at low cost.

For example, a cell (the transmission controller 36) may be configured by a film shaped louver structure body, this cell supported above the LED substrate 58 by the support section 64, and the hologram recording layer 60A formed by pouring a photopolymer from a dispenser into the cell in an amount that does not overflow.

As stated later, each of the parameters of the signal beam and the reference beam for hologram element recording are set appropriately in order to obtain the desired diffracted beams (desired converged beam spots). The transmission controller 36 is pre-set so as to obtain a transmission beam with the desired spread angle $\alpha$ passing along the optical path of the reference beam that recorded the hologram element.

Next, a protective layer (not shown in the drawings) may be formed above the hologram recording layer 60A, such as, for example, by mounting a thin plate shaped cover glass transparent to the recording light and regeneration light on the surface of the hologram recording layer 60A, or the like. Chip alignment detection is then performed, and the positioned of the plural LEDs 50, these being the light emitting points, measured.

Figure 8C:
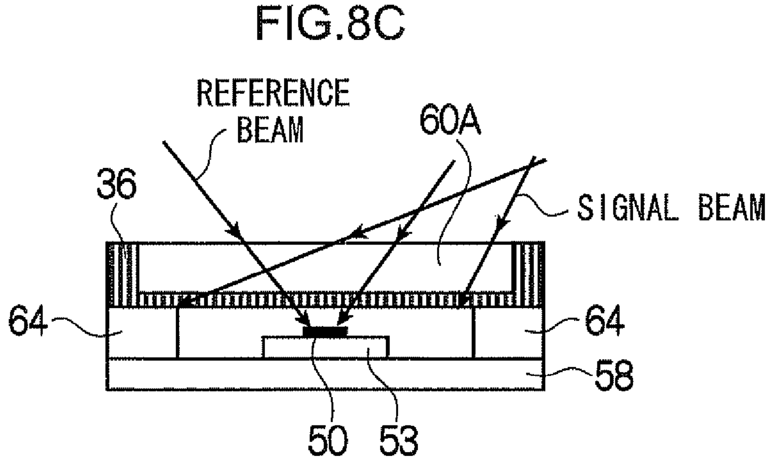

Next, as shown in FIG. 8C, both the signal beam and the reference beam are illuminated at the same time onto the photopolymer formed hologram recording layer 60A from the front face side, and the plural hologram elements 54 are formed in the hologram recording layer 60A by interference of the signal beam and the reference beam. A laser beam is illuminated as the signal beam so as to be transmitted in the opposite direction along the optical path of the desired diffracted beam. Furthermore, a laser beam is illuminated as the reference beam so as to be transmitted through the hologram recording layer 60A along an optical path of converging bundle of light, converging from the desired hologram diameter $r_H$ to the light emitting point. Namely, as shown in FIG. 7B, a hologram is recorded by phase conjugation. The laser beams employed for the laser beam and the reference beam are, for example laser beams oscillated from a semiconductor laser with a wavelength of 780 nm.

First, the laser beam illumination position, illumination angle, spreading angle, converging angle and the like are calculated for the signal beam and the reference beam from measurement data obtained during the above chip alignment detection, and from the design values of the hologram elements 54 (the hologram diameter $r_H$, the hologram thickness $h_H$). The signal beam is designed here such that the optical axis of the diffracted beam generated with each of the hologram elements 54 (regenerated signal beam) is emitted in a direction forming the angle of $\theta$ degrees to the emission beam optical axis, converging in the direction of the photoreceptor drum 12. A writing optical system is disposed for illuminating the designed signal beam and reference beam.

Employing a converging spherical wave as the reference beam with the writing optical system thus disposed and fixed, the LED substrate 58 formed with the hologram recording layer 60A is moved relative to the signal beam and the reference beam. The LED substrate 58 is successively moved at the light emitting point pitch such that the reference beam converges in turn at each of the plural LEDs 50. Plural hologram elements 54 are thus multiplex recorded by spherical wave shift multiplexing in the hologram recording layer 60A.

Figure 8D:
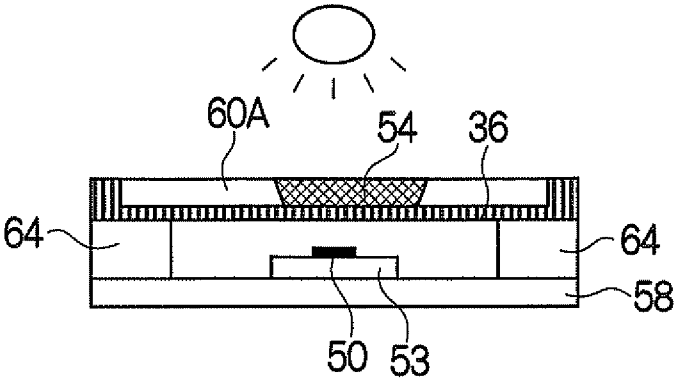

Next, as shown in FIG. 8D, the entire surface of the hologram recording layer 60A is exposed by ultraviolet light irradiation, polymerizing all of the photo-polymerizable monomer. The refractive index distribution is fixed by this fixing processing.

There is, for example, a mixture of a photo-polymerizable monomer and a separate non-polymerizable compound provided as a photo-polymer. In such cases, when an interference fringe is illuminated onto the photo-polymer, the photo-polymerizable monomer is polymerized in the light portions, generating a photo-polymerizable monomer density gradient. As a result, photo-polymerizable monomer diffuses into the light portions, generating a refractive index distribution between the light portions and the dark portions. The whole surface is then light-exposed, and remaining photo-polymerizable monomer in the dark portions is polymerized, completing the polymerization reaction and rendering a state in which further writing and erasing cannot be performed. Systems based on various recording mechanisms are proposed as the hologram recording material. Any of these materials may be employed in the present invention as long as they are materials recordable by refractive index modulation according to a light intensity distribution.

Figure 8E:
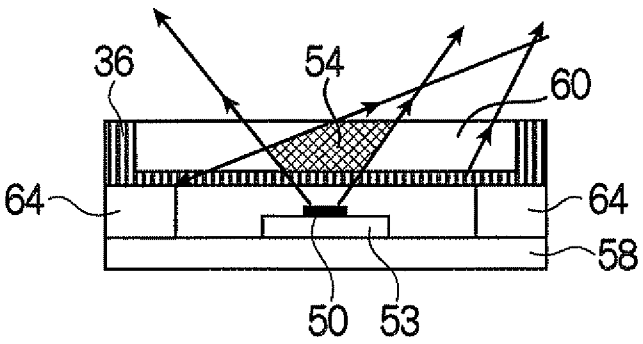

Finally, as shown in FIG. 8E, light is emitted in sequence from the plural LEDs 50, detecting whether or not the desired diffracted beam is obtained by the hologram elements 54 formed corresponding to each of the LEDs 50. This detection process completes the whole manufacturing process.

In the present exemplary embodiment an example of manufacturing has been explained in which a photo-polymer is poured into a cell configured by a film shaped louver structure body, so as to provide the hologram recording layer 60A over the transmission controller 36. Note however that, for example, when two or more louver layers, such as the louver layers 32, 34, are stacked as the transmission controller 36, the film shaped louver structure body may be adhered to the front face or the back face of the hologram recording layer 60A in a sheet form. Configuration may also be made with the cell manufactured from a base member having a louver structure body, and then pouring a photo-polymer in the cell. In such cases, the hologram recording layer 60A provided to the transmission controller 36 is supported above the LED substrate 58 by the support section 64.

Hologram Regeneration Method

Figure 9A:
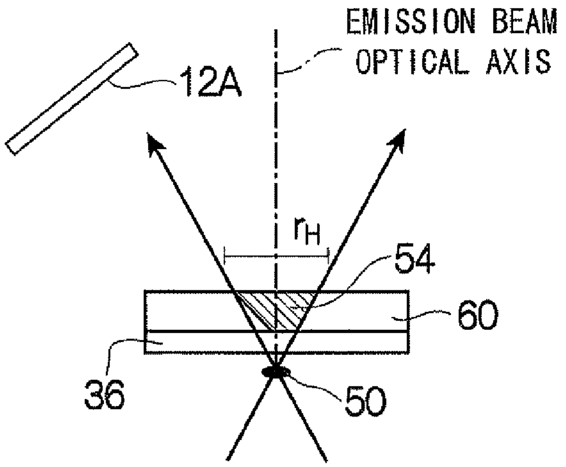
FIG. 9A and FIG. 9B are diagrams showing a way in which a hologram is regenerated, generating a diffracted beam.
Figure 9B:
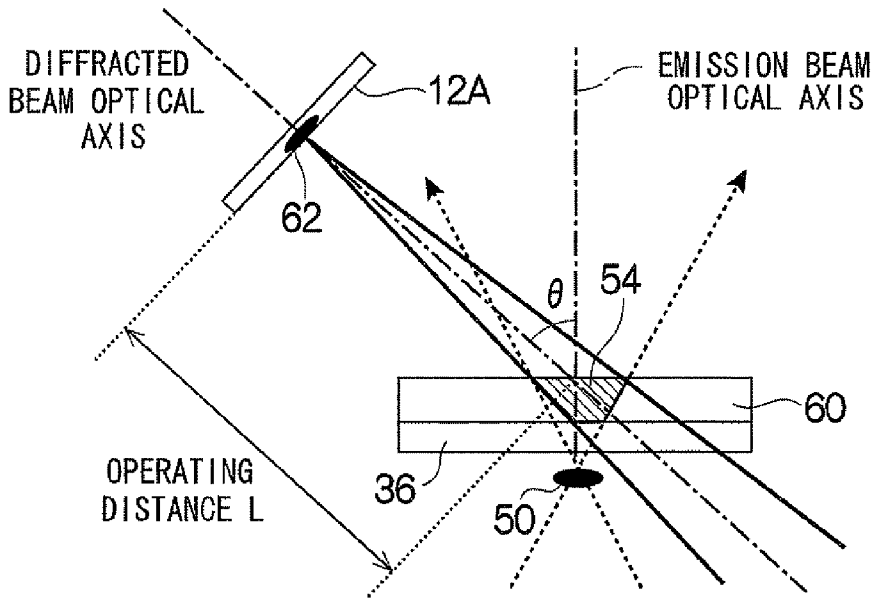

Next, explanation follows regarding a hologram regeneration method. FIG. 9A and FIG. 9B are diagrams showing an element in which a diffracted beam is generated from a hologram element, namely an element in which a hologram recorded in a hologram recording layer is regenerated, generating a diffracted beam. As shown in FIG. 9A, in the present exemplary embodiment, when the LED 50 is caused to emit light, a portion of the diffuse light emitted from the LED 50 is transmitted through the transmission controller 36, and passes along the optical path of the reference beam, while spreading out from the light emitting point to the hologram diameter $r_H$. Due to the emitted light of the LED 50, a substantially similar state is achieved to that when the reference beam was illuminated onto the hologram element 54.

As shown in FIG. 9B, due to illumination of the reference beam, shown by dotted lines, the same beam as the signal beam, shown by the solid lines, is regenerated from the hologram element 54, and emitted as the diffracted beam. The emitted diffracted beam converges, forming an image on the surface 12A of the photoreceptor drum 12 at the operating distance of a few cm. The spots 62 are formed on the surface 12A. FIG. 9B is a schematic illustration of the surface 12A, however due to the hologram diameter $r_H$ being a few mm in size, and the operating distance L being a few cm, the surface 12A is actually at a considerably separated position. Therefore, the hologram element 54 is not actually of the conical cone shape shown, but rather is of a truncated circular cone shape like that shown in FIG. 4A.

As shown in FIG. 2, six individual spots $62_1$ to $62_6$ are formed in a row along the fast scanning direction on the photoreceptor drum 12, corresponding to the LEDs $50_1$ to $50_6$ of the LED array 52. The six individual spots $62_1$ to $62_6$ are focused spots where images of the diffracted beams of the hologram elements $54_1$ to $54_6$ are formed. The volume hologram has high incident angle selectivity and wavelength selectivity, and a high diffraction rate is generally obtained. Accordingly, in the present exemplary embodiment, unwanted exposure light is reduced by the transmission controller 36, the signal beam is regenerated with good precision, and very small diameter spots (focused beam spots) with sharp outlines are formed on the surface 12A.

Transmission Light Control by Transmission Controller

Figure 10:
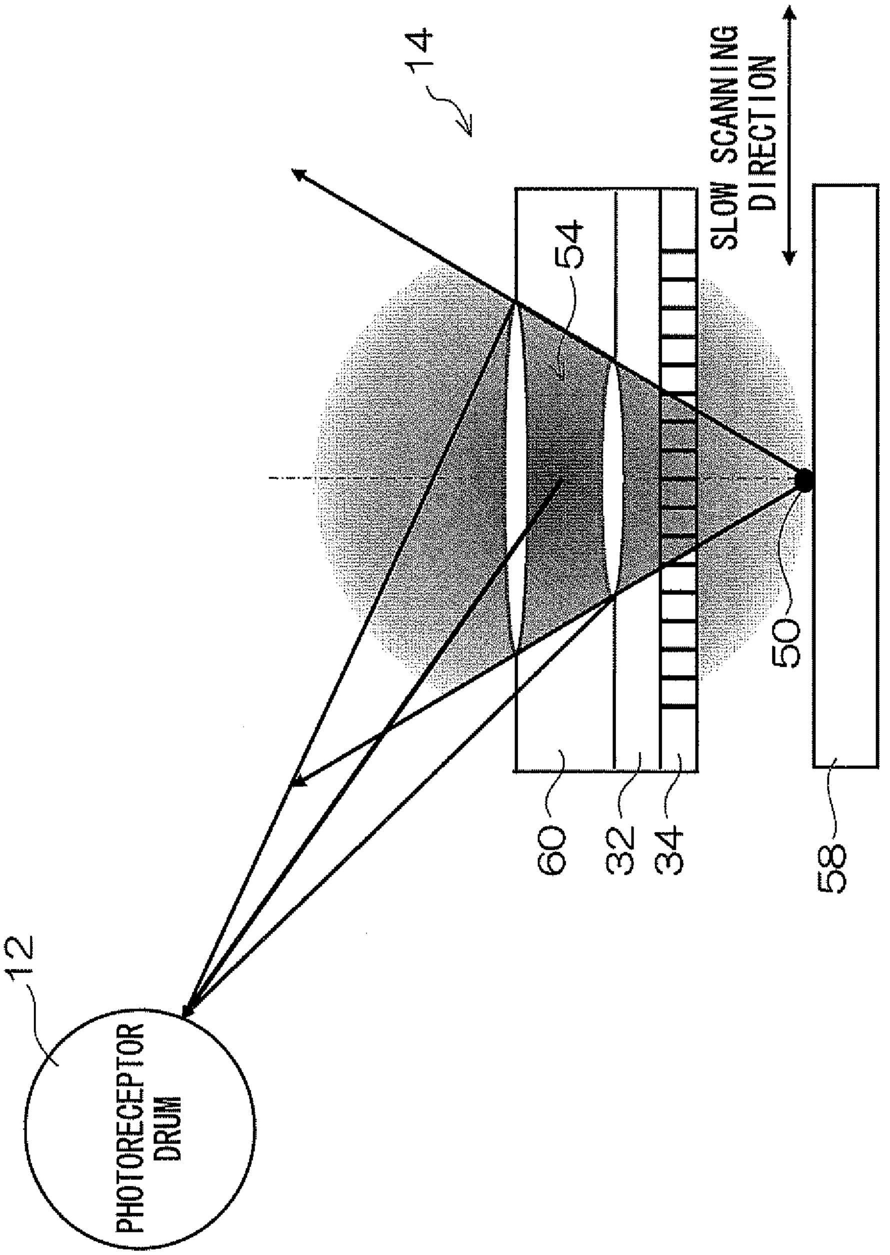
FIG. 10 is a diagram showing a way in which transmission light is controlled in the slow scanning direction by a louver structure.
Figure 11:
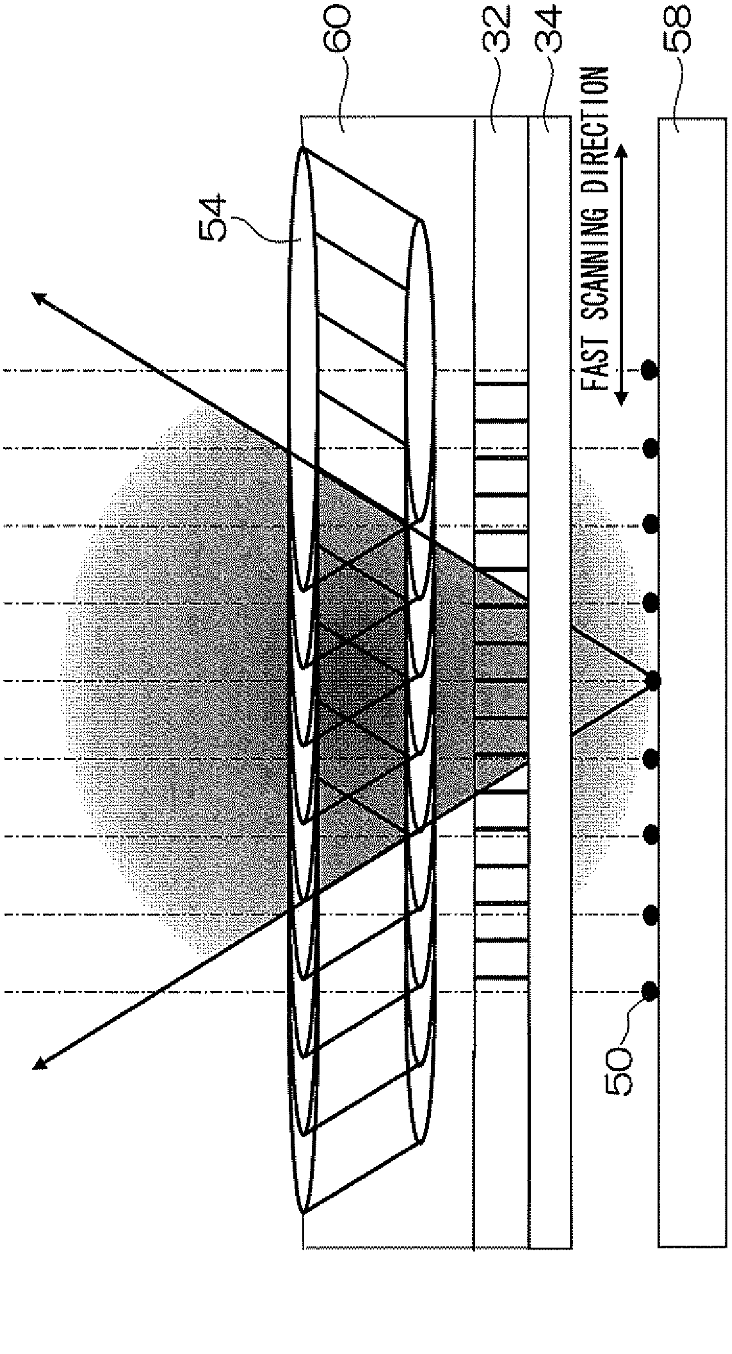
FIG. 11 is a diagram showing a way in which transmission light is controlled in the fast scanning direction by a louver structure.

Detailed explanation now follows regarding control of transmission light by the transmission controller 36. FIG. 10 is a diagram showing a way in which transmission light is controlled in the slow scanning direction by a louver structure. FIG. 11 is a diagram showing a way in which transmission light is controlled in the fast scanning direction by a louver structure.

As shown in FIG. 10, in the LPH 14 of the present exemplary embodiment, the louver layer 34 is disposed on the light incident side of the hologram recording layer 60 for controlling transmission light in the slow scanning direction. In the slow scanning direction, the louver layer 34 transmits a portion of diffuse light emitted from the LED 50 traveling along the optical path of the reference beam that recorded the hologram element 54, and blocks other light (so-called "stray light") passing outside the optical path of the reference beam. Stray light is not diffracted by the hologram elements 54, and would be illuminated onto the photoreceptor drum 12 as zero order light, generating background noise. In the present exemplary embodiment, the stray light is blocked by the louver layer 34, reducing unwanted exposure light.

Furthermore, as shown in FIG. 11, in the LPH 14 of the present exemplary embodiment, the louver layer 32 is also disposed on the light incident side of the hologram recording layer 60 for controlling transmission light in the fast scanning direction. In the LPH 14, the plural LEDs 50 are arrayed in a row along the fast scanning direction, and the plural hologram elements 54 are arrayed in a row along the fast scanning direction corresponding to each of the respective LEDs 50. In the fast scanning direction, the louver layer 32 transmits a portion of diffuse light emitted from the LED 50 transmitted along the optical path of the reference beam that recorded the corresponding hologram element 54, and blocks other light passing outside the optical path of the reference beam. This other light is diffracted by another non-corresponding hologram element 54 and would be illuminated onto the photoreceptor drum 12, generating cross-talk noise (scattering noise). However, in the present exemplary embodiment, light incident to non-corresponding hologram elements 54 is blocked by the louver layer 32, reducing unwanted exposure light.

LPH Modified Example 1

Explanation has been given above of a case in which the optical axes of the reference beams (emission beam optical axes) are parallel in the slow scanning direction to the normal direction to the hologram recording layer. However, as shown in FIG. 12, when the optical axes of the reference beams are inclined with respect to the normal to the hologram recording layer, the louver layer 34 may be disposed at the light incident side of the hologram recording layer 60, similarly to in the LPH 14 shown in FIG. 10, for controlling transmission light in the slow scanning direction.

Figure 12:
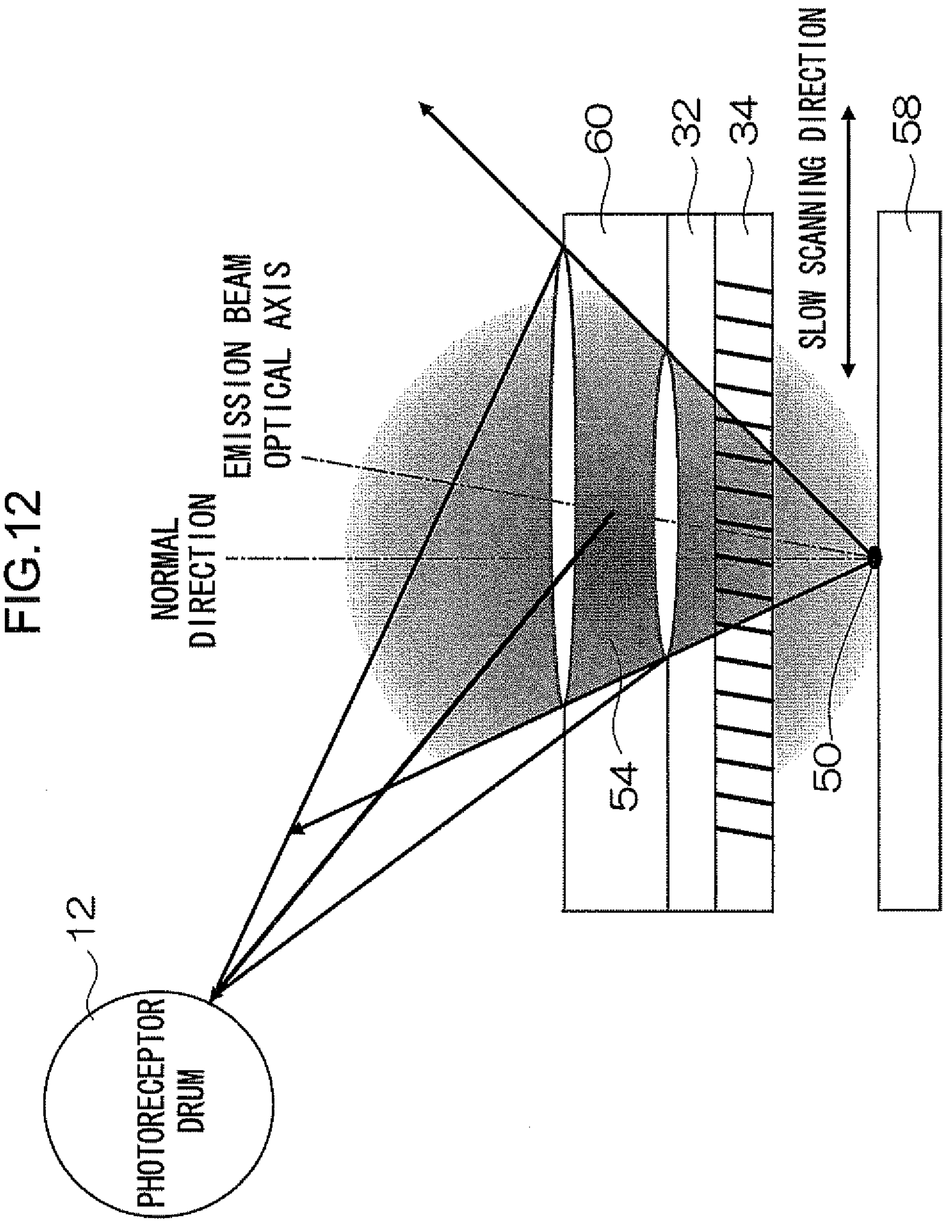
FIG. 12 is a diagram showing a way in which transmission light is controlled in the slow scanning direction by a louver structure with light blocking sections disposed at an inclination with respect to the normal direction.

FIG. 12 is a diagram showing a way in which transmission light is controlled in the slow scanning direction by a louver structure in which light blocking sections are disposed inclined to the normal direction. As shown in FIG. 12, since the optical axis of each of the reference beams is inclined with respect to the normal direction of the hologram recording layer 60, overlapping of the signal beam and the reference beam is increased during hologram recording, and a hologram element 54 with larger hologram diameter is formed in the hologram recording layer 60. The optical axis of the reference beam is inclined towards the opposite side to the emission direction of the diffracted beam, avoiding the regenerated reference beam transmitted through the hologram from being illuminated onto the photoreceptor drum 12.

In the slow scanning direction, the louver layer 34 transmits a portion of diffuse light emitted from the LED 50 transmitted along the optical path of the reference beam that recorded the hologram element 54, and blocks other light passing outside the optical path of the reference beam. Consequently, stray light is blocked by the louver layer 34, reducing unwanted exposure light. The angle at which the light blocking sections are disposed is a factor determining the direction of the center line of the "spread angle $\alpha$". Namely, by appropriately setting the parameters expressing the louver structure, transmitted light with the desired spread angle $\alpha$ is obtained according to the optical path of the reference beam of inclined optical axis due to the louver layer 34.

Figure 13:
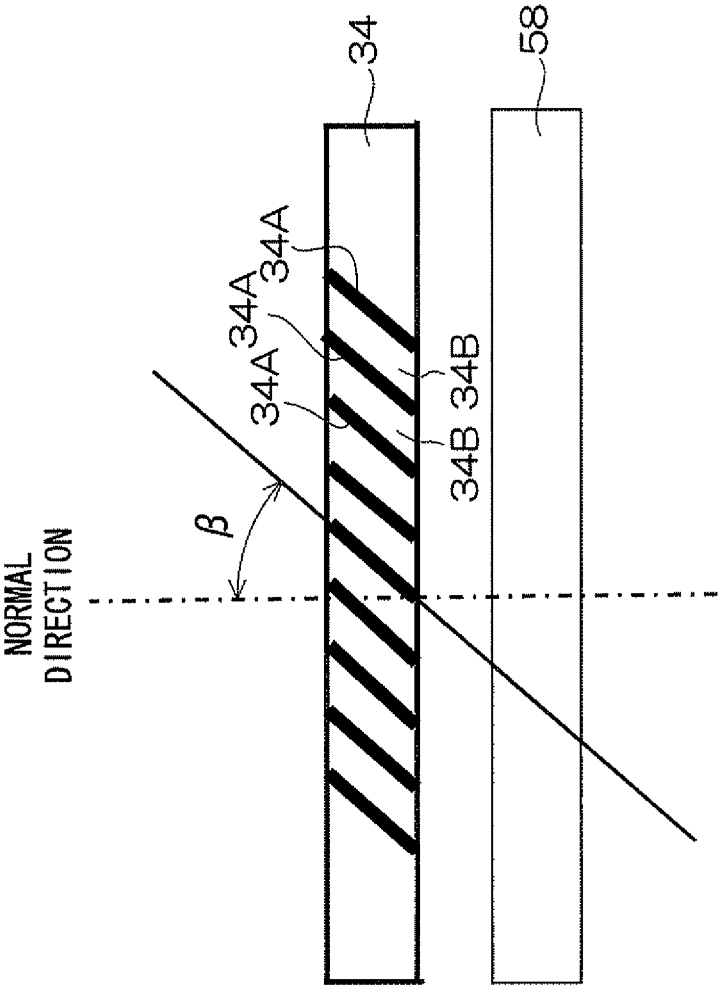
FIG. 13 is diagram for defining the disposition angle of the light blocking sections.

FIG. 13 is a diagram defining the disposition angle of the light blocking sections. As shown in FIG. 13, the disposition angle of vane shaped light blocking sections 34A in the louver layer 34 is defined as having the inclination angle $\beta$ with respect to the normal direction. This inclination angle $\beta$ is referred to as the "louver angle". Note that while the normal direction here is the normal direction to the louver layer 34, when the louver layer 34 and the LED substrate 58 are disposed parallel to each other, this normal direction matches the normal direction of the LED substrate 58. As explained above, the inclination angle $\beta$ (louver angle) is determined so as to obtain the transmission light of the desired spread angle $\alpha$ according to the optical path of the reference beam of inclined optical axis, while also considering other factors such as the disposition interval of light blocking sections and the like.

LPH Modified Example 2

Explanation has been given in the above exemplary embodiments of examples where the transmission controller 36 (the louver layers 32, 34) is disposed on the light incident side of the hologram recording layer 60. However, as shown in FIG. 14, configuration may be made with the louver layer 32 for controlling transmission light in the fast scanning direction disposed on the light emission side of the hologram recording layer 60.

Figure 14:
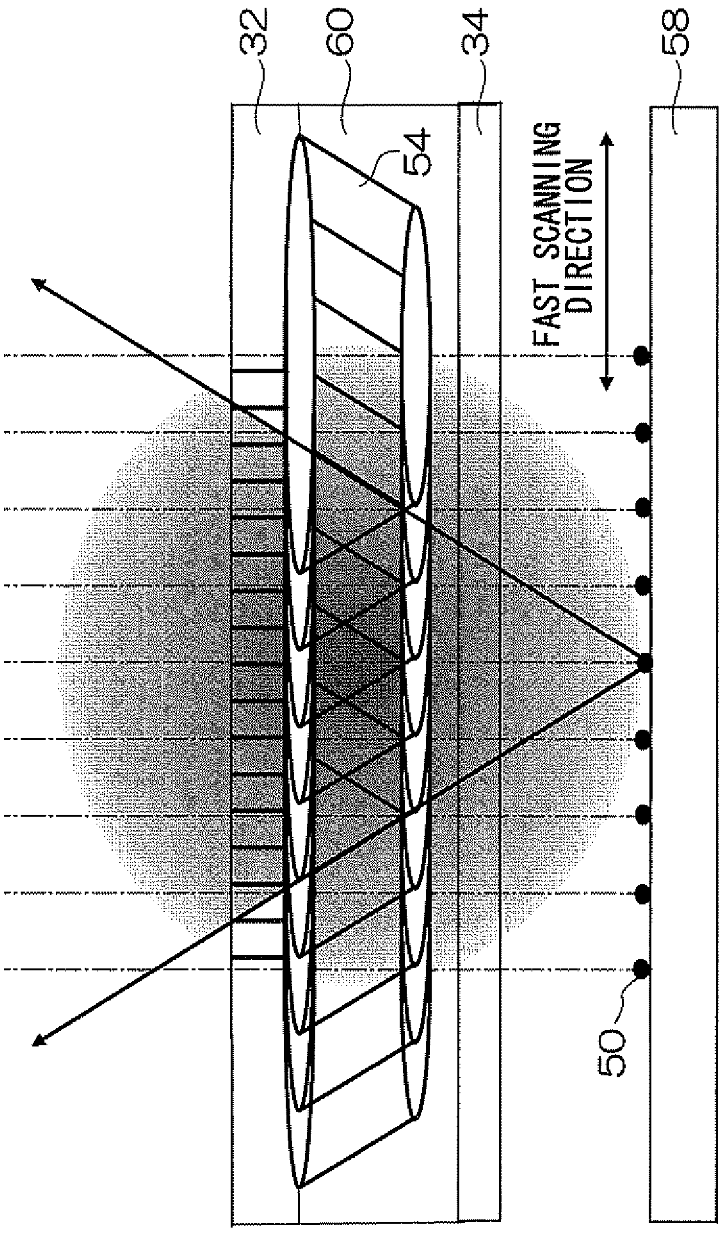
FIG. 14 is a diagram showing a way in which transmission light is controlled in the fast scanning direction by a louver structure disposed on the light emission side of a hologram recording layer.

FIG. 14 is a diagram showing a way in which transmission light and the diffracted beam are controlled in a fast scanning direction by a louver structure disposed on the light emission side of the hologram recording layer. A louver structure when disposed on the light incident side has the function of preventing as much as possible diffuse light emitted from the LEDs 50 from being incident on non-corresponding hologram elements 54. However, as shown in FIG. 14, a louver structure when disposed on the light emission side limits the emission angle from the hologram elements 54 in the fast scanning direction. Namely, the components of the diffracted beam from the hologram element 54 spreading out in the fast scanning direction can be blocked. The diffracted components spreading out in the fast scanning direction would become cross-talk noise (scatting noise) in the spots 62 arrayed along the fast scanning direction. In the louver structure shown in FIG. 14, by limiting the cross-talk noise and range, unwanted exposure light illuminated onto the photoreceptor drum 12 is reduced.

Other Modified Examples

As described above, explanation has been given of examples of LED print heads provided with plural LEDs, however other light emitting elements may be employed in place of LEDs, such as, for example, electroluminescent (EL) elements, laser diodes (LD) or the like. Very small diameter spots with a sharp outline are formed by designing the hologram elements according to the characteristics of the light emitting elements, and by preventing unwanted exposure light, such as from stray light that is significantly generated when incoherent light is employed.

As described above, explanation has been given of an example in which plural hologram elements are multiplex recorded by spherical wave shift multiplexing, however plural hologram elements may be multiplex recorded by another multiplexing method, as long as the multiplexing method is one capable of obtaining the desired diffracted beams. Configuration may also be made with a combination of plural types of multiplexing method. Examples of other multiplexing methods include, for example, angle multiplex recording in which the incident angles of the reference beams are changed during recording, wavelength multiplex recording in which the wavelength of the reference beams are changed during recording, and phase shift multiplex recording in which the phase of the reference beams are changed during recording. Individual diffracted beams are regenerated without crosstalk from such plural multiplex recorded holograms.

Furthermore, as described above, explanation has been given of an example in which the image forming apparatus is a tandem digital color printer, and the photoreceptor drum of each image forming unit is exposed using an LED print head as an exposing device. However there is no particular limitation to the above application example, and application may be made to any image forming apparatus that forms an image by imagewise exposure of a photosensitive image recording medium using an exposing device. For example, the image forming apparatus is not limited to a digital color printer using an electrophotographic method. The exposing device of the present invention may be installed in a silver-halide image forming apparatus, in a writing apparatus that writes light onto electronic paper or the like. The photosensitive image recording medium is also not limited to a photoreceptor drum.

The exposing device described in the above example application may also be applied to exposure of, for example, a sheet form photoreceptor or a photographic light-sensitive material, photoresist, photopolymer or the like.

What is claimed is:

1. An exposing device comprising:

a light emitting element array of a plurality of light emitting elements arrayed in a row along a predetermined first direction;

a hologram recording layer in which a plurality of hologram elements are multiplex recorded such that each of the hologram elements corresponds to one of the plurality of light emitting elements and diffracts an emission beam from the light emitting element and converges the light onto a light exposure plane, such that a plurality of focused beam spots are formed on the light exposure plane in a row along the first direction; and a first transmission control section, disposed at a light incident side of the hologram recording layer, provided with a structure in which light blocking sections and light transmitting sections are alternately arrayed along a second direction intersecting with the first direction, and selectively transmitting in the second direction light passing along an optical path of a reference beam that recorded the hologram element.

2. The exposing device of claim 1, further comprising:

a second transmission control section, disposed at the light incident side, at the light emission side, or at a combination thereof, of the hologram recording layer, the second transmission control section provided with a structure in which light blocking sections and light transmitting sections are alternately arrayed along the first direction, and selectively transmitting in the first direction light passing along the optical path of the reference beam that recorded the hologram element.

3. The exposing device of claim 1, wherein, when, in the second direction, the optical path of the reference beam is inclined towards the side opposite to the emission direction of the diffracted emission beam with respect to the normal to the hologram recording layer, the respective light blocking sections of the first transmission control section are each disposed inclined at a predetermined angle to the normal to the hologram recording layer.

4. The exposing device of claim 2, wherein, when, in the second direction, the optical path of the reference beam is inclined towards the side opposite to the emission direction of the diffracted emission beam with respect to the normal to the hologram recording layer, the respective light blocking sections of the first transmission control section are each disposed inclined at a predetermined angle to the normal to the hologram recording layer.

5. The exposing device of claim 1, wherein the first transmission control section comprises a film shaped louver structure body disposed in contact with the light incident side of the hologram recording layer.

6. The exposing device of claim 2, wherein the first transmission control section comprises a film shaped louver structure body disposed in contact with the light incident side of the hologram recording layer.

7. The exposing device of claim 3, wherein the first transmission control section comprises a film shaped louver structure body disposed in contact with the light incident side of the hologram recording layer.

8. The exposing device of claim 2, wherein the second transmission control section comprises a film shaped louver structure body disposed in contact with the light incident side, the light emission side, or a combination thereof, of the hologram recording layer.

9. The exposing device of claim 3, wherein the second transmission control section comprises a film shaped louver structure body disposed in contact with the light incident side, the light emission side, or a combination thereof, of the hologram recording layer.

10. The exposing device of claim 5, wherein the second transmission control section comprises a film shaped louver structure body disposed in contact with the light incident side, the light emission side, or a combination thereof, of the hologram recording layer.

11. An image forming apparatus comprising:

the exposing device of claim 1; and a photosensitive image recording medium disposed with a separation of a predetermined operation distance from the exposing device, fast scanned in the first direction and recorded with an image by the exposing device according to image data.

12. An image forming apparatus comprising:

the exposing device of claim 2; and a photosensitive image recording medium disposed with a separation of a predetermined operation distance from the exposing device, fast scanned in the first direction and recorded with an image by the exposing device according to image data.

13. An image forming apparatus comprising:

the exposing device of claim 3; and a photosensitive image recording medium disposed with a separation of a predetermined operation distance from the exposing device, fast scanned in the first direction and recorded with an image by the exposing device according to image data.

14. An image forming apparatus comprising:

the exposing device of claim 5; and a photosensitive image recording medium disposed with a separation of a predetermined operation distance from the exposing device, fast scanned in the first direction and recorded with an image by the exposing device according to image data.

15. An image forming apparatus comprising:

the exposing device of claim 8; and a photosensitive image recording medium disposed with a separation of a predetermined operation distance from the exposing device, fast scanned in the first direction and recorded with an image by the exposing device according to image data.

* * * * *